US000001894H

United States Statutory Invention Registration [19]

[11] Reg. Number: H1,894

Fletcher et al.

[45] Published: Oct. 3, 2000

[54] FLEXIBLE TELECOMMUNICATIONS SYSTEM ARCHITECTURE

[75] Inventors: Anthony G. Fletcher; Scott D. Hoffpauir, both of Collierville, Tenn.

[73] Assignee: DSC/Celcore, Inc., Plano, Tex.

[21] Appl. No.: 09/026,320

[22] Filed: Feb. 19, 1998

Related U.S. Application Data

[60] Provisional application No. 60/060,107, Sep. 26, 1997.

[51] Int. Cl.[7] ..... H04Q 7/20

[52] U.S. Cl. ..... 455/403

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "Hybrid MicroSystems: The Ultimate Flexibility in Cellular Applications", 1996, pp. 1–16, Celcore, Inc., Memphis, Tennessee.

"GlobalHub Mobility Manager—Enables "One Number" PCS Service Via Motorola PPS Residential Products" pp. 1–2, Celcore, Inc., Memphia, Tennessee, 1996.

"IS–41 Network Hub—The Mobility Manager for Celcore's GlobalSystem" pp. 1–2, Celcore, Inc., Memphis, Tennessee, 1996.

"GlobalHub" pp. 1–10, Celcore, Inc., Memphia, Tennessee, 1996.

John Scourias, "Overview of the Global System for Mobile Communications", Mar. 27, 1996, pp. 1–16, John Scourias.

Martin A. Iroff & Steve Chen, "A distributed GSM Architecture for Low–Traffic Density Markets", *Mobile Communications International*, Oct. 1996, pp. 1–3, IBC Business Publishing, London, England.

Information pamphlet, Feb. 1997, pp. 1–7, Version 1.0, Celcore, Inc., Memphis, Tennessee.

"BS–20/BS–21, D900/D1800 Base Transceiver Station", pp. 1–2, Geschaftszweig Mobilfunknetze, Munchen, Germany, 1997.

"Unique Solutions to Complex Challenges of Wireless Carriers" pp. 1–9, Celcore, Inc., Memphis, Tennessee, 1997.

Michel Mouly and Marie–Bernadette Pautet "The GSM System for Mobile Communications", 1992, pp. 79–122, pp. 261–646, Cell & Sys, France.

George Lamb "GSM made SIMple", 1997, pp. 3–158, Regal Printing, United States of America.

*Primary Examiner*—Daniel T. Pihulic
*Attorney, Agent, or Firm*—John G. Flaim

[57] ABSTRACT

A flexible architecture for a telecommunications system is disclosed herein. Such architecture provides for different software layers, which include one or more software entities, based on a logical grouping of like or similar functions. For example, a call processing software layer, a resource software layer and a network management software layer may be provided to carry out particular operations. Further, the network management software layer may be divided into a client layer, which presents operations, administration and maintenance related information to a user for adaptation by the user, and a server layer, which stores and accesses operations, administration and maintenance related information. Object request broker technology is utilized to allow a software entity of one software layer to invoke operations associated with another software entity provided by another software layer.

37 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLEXIBLE TELECOMMUNICATIONS SYSTEM ARCHITECTURE

CLAIM OF PRIORITY

The instant patent application claims priority from the U.S. provisional patent application designated with Ser. No. 60/060,107, entitled "Cellular Communication System," naming Anthony G. Fletcher and Scott D. Hoffpauir as inventors, and which was filed on Sep. 26, 1997.

RELATED PATENT APPLICATIONS

The instant patent application is directly related to the following patent applications: (a) the U.S. patent application Ser. No. 09/025,870 designated by DSC Case No. 834-00 and Attorney Docket No. 24194000.180, entitled "Integrated Telecommunications System," naming Anthony G. Fletcher and Scott D. Hoffpauir as inventors, and which was filed concurrently with the instant patent application; (b) the U.S. patent application Ser. No. 09/026,190 designated by DSC Case No. 835-00 and Attorney Docket No. 24194000.181, entitled "Resource Management Sub-System of a Telecommunications Switching System," naming Howard L. Andersen and Scott D. Hoffpauir as inventors, and which was filed concurrently with the instant patent application; (c) the U.S. patent application Ser. No. 09/026,810 designated by DSC Case No. 836-00 and Attorney Docket No. 24194000.182, entitled "Generic Wireless Telecommunications System," naming Anthony G. Fletcher and Scott D. Hoffpauir as inventors, and which was filed concurrently with the instant patent application; (d) the U.S. patent application Ser. No. 09/026,487 designated by DSC Case No. 833-00 and Attorney Docket No. 24194000.179, entitled "Network Management System Server and Method for Operation," naming Scott D. Hoffpauir as inventor, and which was filed concurrently with the instant patent application; (e) the U.S. patent application Ser. No. 09/026,230 designated by DSC Case No. 852-00 and Attorney Docket No. 24194000.197, entitled "Application Provider and Method for Communication," naming Scott D. Hoffpauir and Steve B. Liao as inventors, and which was filed concurrently with the instant patent application; and (f) U.S. patent application Ser. No. 08/678,254, now U.S. Pat. No. 5,835,486, entitled "Multi-Channel Transcoder Rate Adapter Having Low Delay and Integral Echo Cancellation," naming James M. Davis and James D. Pruett as inventors, and which was filed Jul. 11, 1996.

FIELD OF THE INVENTION

The present invention relates to a telecommunications systems, and more particularly, to a flexible architecture of a telecommunications system that facilitates adaptability and interoperability of elements of a telecommunications systems.

BACKGROUND

Conventional telecommunication systems typically include various hardware platforms and software to carry out its operations. Software is, and continues to, provide for a significant portion of the functionality associated with such systems. Conventional telecommunications systems utilize software that is constructed using structured programming principles, such as C language, to produce large monolithic applications. Those applications typically include thousands of loosely organized lines of executable code.

Conventional telecommunications systems are inflexible and difficult to adapt due to their use of conventional software. Different programming languages and operating systems are often used by different conventional software applications. As a result, it is difficult for one application to use the operations and functions provided by another application. In other words, there is an inadequate ability for applications to effectively communicate and cooperate in a collective manner. Similar operations and functions are therefore duplicated in different applications to avoid the obstacles encountered in accessing another application's operations.

Further, even within a given application, functionality is limited by the monolithic and complex nature of applications, which includes multiple interdependent lines of code. That is, there is a large degree of interdependence among executable code found in conventional applications, i.e., specific functions are intermixed throughout the code and not isolated. As a result, redesigning a particular area of code often leads to undesirable effects on other areas of code. This severely inhibits the ability to modify, by adding new functions or removing or adapting existing functions, conventional software code. It also requires a significant collaborative effort among designers. Significant expenditures of time and resources are thus incurred in designing and redesigning software code found in conventional telecommunications systems. Numerous other undesirable consequences result from the use of conventional software, such as the inability to interface with other systems or devices, an inability to provide a modular system, and difficulties in incorporating newly developed or third party software applications within a system.

SUMMARY OF THE INVENTION

The present invention sets out to, among other things, overcome the aforementioned problems associated with conventional wireless telecommunications systems by providing a flexible architecture in which functional elements within and outside diverse environments and applications can effectively communicate.

One object of the present invention is to provide a telecommunications system, which is operable to carry out complex functions, having a flexible architecture.

Another object of the present invention is to provide an architecture in which like or similar elements are logically grouped together and isolated from other elements while still allowing for elements not in the same grouping to effectively communicate and cooperate with each other.

Yet another object of the present invention is to provide an architecture whereby the functionality of one or more elements is sufficiently isolated so that such elements may be modified or replaced without having an adverse impact on other elements, i.e., a low coupling of elements.

An additional object of the present invention is to provide an architecture for a telecommunications system that accommodates and facilitates the incorporation of additional functionality into the telecommunications system, and that allows for functionality already incorporated to be readily removed from a telecommunications system.

Still another object of the present invention allows for the use of operations provided in one application for different applications.

A further object of the present invention is to provide an architecture in which there is interoperability amongst elements, including the ability for different elements to make use of dissimilar programming languages and operating systems and to operate in association with dissimilar development and deployment environments, such as dissimilar processors and operating systems.

Another object of the present invention is to provide an architecture that facilitates the addition and removal of processors used by one or more elements.

Yet another object of the present invention is to provide an architecture having one or more elements which can be accessed by an external system through defined interfaces.

In accordance with the present invention, an architecture is provided that includes multiple layers of object oriented software. Software layers are provided based on a logical grouping of like or similar functions. For example, some or all of the following software applications or layers may be included within a telecommunications system: a call processing software layer to provide call processing operations; a resource software layer to manage and provide access to telephony resources; and a management software layer to provide operations, administration and maintenance related operations. One or more software entities, which may each comprise one or more software objects, are included in a software layer. Software entities encapsulate operations that can be invoked by a software entity in a different software layer. As such, the present invention organizes and isolates functionality within distinct software layers and software entities yet provides for effective communications and cooperation between such layers and entities.

In accordance with one aspect of the present invention, a client layer and server layer may be provided in place of the management layer. The client layer is configured to present operations, administration and maintenance related information concerning to a user for adaptation by the user. In contrast, the server layer is configured to store and access the operations, administration and maintenance related information.

In accordance with another aspect of the present invention, methods and techniques are provided to establish effective communications between software entities in different software layers of a telecommunications system. A software object of one software entity, which is sometimes referred to as an originating object, may issue a request for invocation of a specified operation. A particular operation of an object associated with another entity that resides in a different software layer, sometimes referred to as a target object, may be identified based on the specified operation. Information concerning invocation of the particular operation may also be obtained from which a message to the target object may be composed so as to invoke the particular operation. Following proper invocation, the originating object is provided with a response from the target entity based on the results of the invoked operation.

In accordance with yet another aspect of the present invention, an object request broker element may be provided with respect to a given software layer to facilitate the invocation of operations associated with software entities residing on that layer. An object request broker may, for example, maintain information about the location and addressing of software objects and entities within a given software layer, the operations of those software objects and entities that can be invoked, and information needed to invoke those operations. As such, an originating object may turn to an object request broker to form a connection path with a target object and be apprised of operations of the target object that can be invoked. Further, a proxy may be associated with an originating object and act as a local representative of a target object. As such, it may, for example, send a request to a target object concerning the invocation of an operation and receive a response back from that target object concerning the results of that operation.

The present invention is particularly well suited for use in connection with wireless telecommunications switching systems that are designed in accordance with various technologies and standards, including Global System for Mobile Communications (abbreviated GSM), Personal Communications Services (abbreviated PCS), Code Division Multiple Access (abbreviated CDMA), and Time Division Multiple Access (abbreviated TDMA).

Other and further objects, aspects, features and advantages of the present invention will be apparent from the following detailed description of an exemplary embodiment of the invention, given for the purpose of disclosure and taken in conjunction with the accompanying drawings.

BRIEF DESCRIPTION OF THE DRAWINGS

The present invention may be better understood from the following detailed description of an exemplary embodiment of the present invention with reference to the accompanying drawings, in which.

DETAILED DESCRIPTION OF AN EXEMPLARY EMBODIMENT OF THE PRESENT INVENTION

Figure 1:
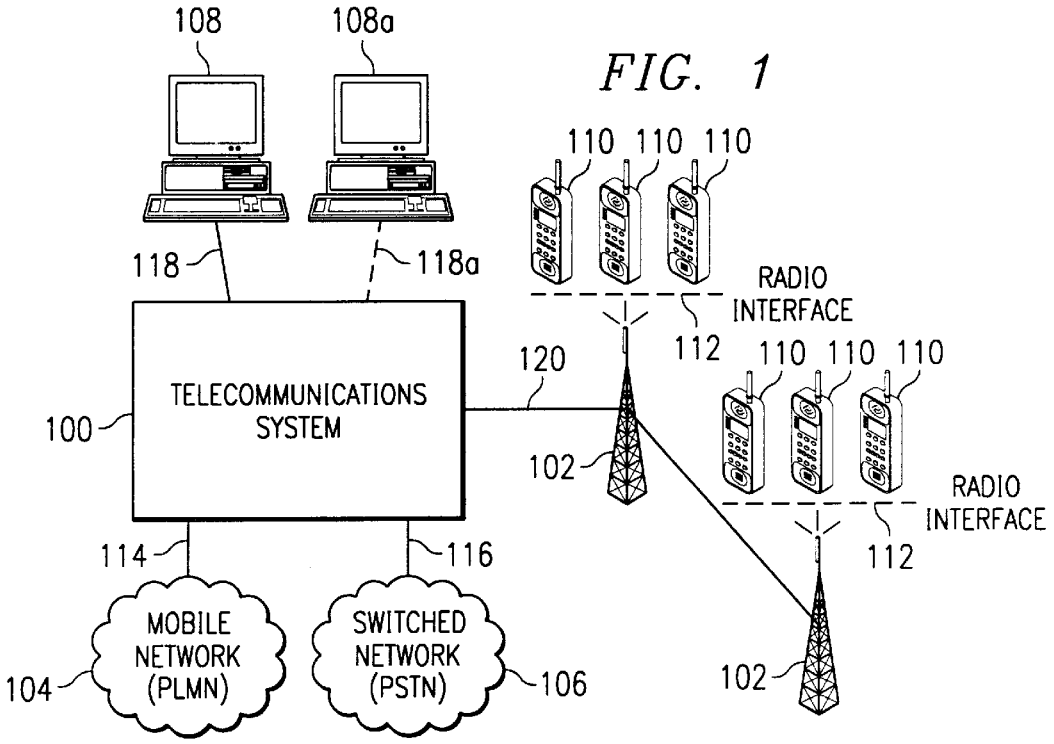
FIG. 1 is a diagram that illustrates a telecommunications system and certain connections associated with that telecommunications system, in accordance with an exemplary embodiment of the present invention.

FIG. 1 illustrates an integrated, wireless telecommunications switching system 100 and certain connections associated with that telecommunications system 100, in accordance with an exemplary embodiment of the present invention. The telecommunications system 100 is operable to provide speech and data services to multiple subscriber units 110. Each subscriber unit 110 provides an interface to a human user, such as through use of a microphone, loudspeaker, display or keyboard of a subscriber unit, or provides an interface to terminal equipment, such as an interface towards a personal computer or facsimile machine, or both. While the subscriber units 110 are illustrated in FIG. 1 as hand held mobile units, it should be appreciated that the implementation of the subscriber units 110 is not so limited. For example, the subscriber units 110 may comprise a fixed antenna assembly connected to a telephone or other interface device. A smart card (not illustrated) may be embodied within a subscriber unit 110 to provide such subscriber unit with subscriber related information and encryption keys.

Communications to and from the subscriber units 110 are established over a radio interface 112 by one or more base stations 102. Base stations 102 directly communicate with subscriber units 110 over radio frequency signals transmitted from, and received by, the base stations over the radio interface 112. Base stations 102 may, for example, include radio transmission and reception devices, antenna assemblies, signaling processing logic specific to the radio interface 112 between the base stations and the subscriber units 110.

A base station 102 is preferably responsible for providing communications to subscriber units 110 located within a particular region, commonly referred to as a service area or cell. One or more base stations 102, typically in a common area, may be logically grouped into what is commonly referred to as a base station site.

The telecommunications system 100 is connected to the base stations 102 by a link 120, such as an E1 or T1 telecommunications line, that provides one or more suitable transmission channels. Digital representations of speech or data information are transmitted over the link 120 between the telecommunications system 100 and the base stations 102, at a predetermined transmission rate.

The telecommunications system 100 is further connected to a mobile network 104 over a link 114 and a switched network 106 over another link 116. A switched network 106 (for example, the Public Switched Telephone Network or PSTN), typically carries voice and data services to fixed locations. Signals transmitted over the switched network link 116 may therefore include ISUP and R2 type signals. A mobile network 104 (for example, the Public Land Mobile Network or PLMN) typically carries data related to mobile or subscriber units. Signals transmitted over the mobile network link 114 may therefore include SS7 and MAP type signals in addition to R2 and ISUP type trunks.

Configuration of the telecommunications system 100 is preferably accomplished by a graphical user interface associated with a local terminal 108 over a wireline connection 118 or associated with a remote terminal 108*a* over a modem link 118*a*.

Figure 2:
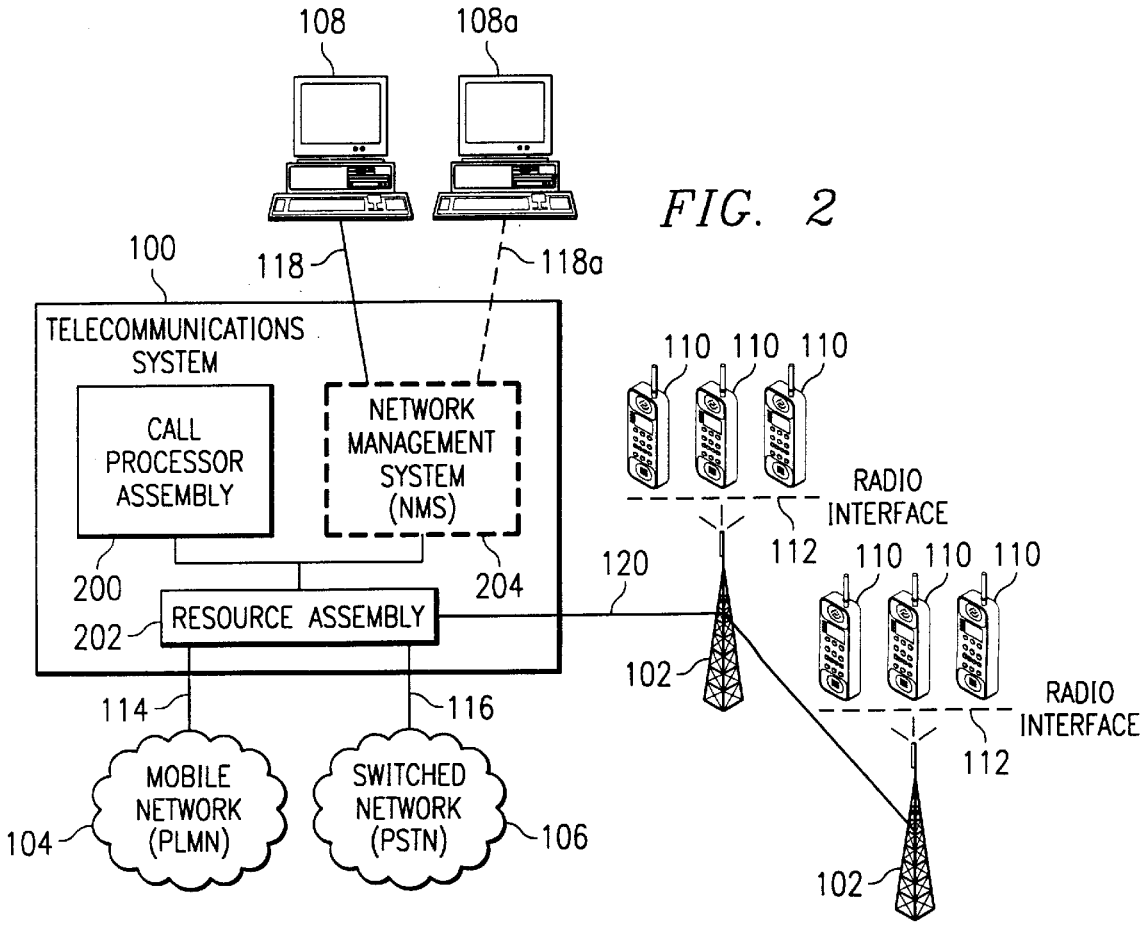
FIG. 2 is a diagram that illustrates various assemblies and systems that may be included within a telecommunications system, in accordance with an exemplary embodiment of the present invention.

FIG. 2 illustrates various assemblies and systems that may be included within the telecommunications system 100, in accordance with an exemplary embodiment of the present invention.

A resource assembly is preferably included within the telecommunications system 100. That resource assembly 202 is preferably connected, either directly or indirectly, to base stations 102 over one link 120, a switched network 106 over another link 116, and a mobile network 104 over yet another link 114. Within the telecommunications system 100, the resource assembly 202 is preferably connected to a call processor assembly 200 as well as a network management system 204. The resource assembly 202, in addition to providing an interface to base stations 102, a switched network 106 and a mobile network 104, includes resources that are available to be employed by the call processor assembly 200.

The call processor assembly 200 includes elements that are operable to process calls directed to, or received from, subscriber units 110, a switched network 106 and a mobile network 104. The call processor assembly 200 is operable to handle call processing functions needed by the telecommunications system 100, including call origination, location updating, handovers between cells, trunking and call termination. The call processor assembly 200 may include a general purpose computing platform, such as an Intel Pentium II based computing platform, that includes suitable hardware and/or software systems to support call processing functions. The call processor assembly 200 may use a real-time operating system, such as a QNX operating system, to support the real-time call processing requirements of telecommunications system 100.

As illustrated in FIG. 2, the network management system 204 may be embodied within the telecommunications system 100 or external to the telecommunications system 100. Certain elements of the network management system 204 are preferably provided within the telecommunications system 100 while others are provided externally. It should also be appreciated that while the call processor assembly 200, resource assembly 202 and network management system 204 are illustrated as distinct assemblies, some or all of the functionality of those entities may nevertheless be integrated into a single assembly consistent with the spirit and scope of the present invention.

In accordance with the present invention, a software architecture including more than one software layer is associated with the telecommunications system 100. The functions of the telecommunications system 100 are preferably logically divided or partitioned amongst the layers, i.e., each layer preferably includes a distinct logical grouping of like or similar functions. Functions of a software layer are further logically divided among one or more encapsulated software entities. A software entity may comprise one or more encapsulated software objects. A software layer therefore isolates the software entities included in the layer from other layers. A software entity and its associated objects further isolate those functions by encapsulation. This allows for such software layers and software entities to be developed relatively independently of one another. Although providing for isolation by use of software layers and entities, the present invention also provides for communications between the software layers and entities, and in particular, the ability for a software entity found in one software layer to communicate and use operations of another software entity found in a different software layer.

Figure 3A:
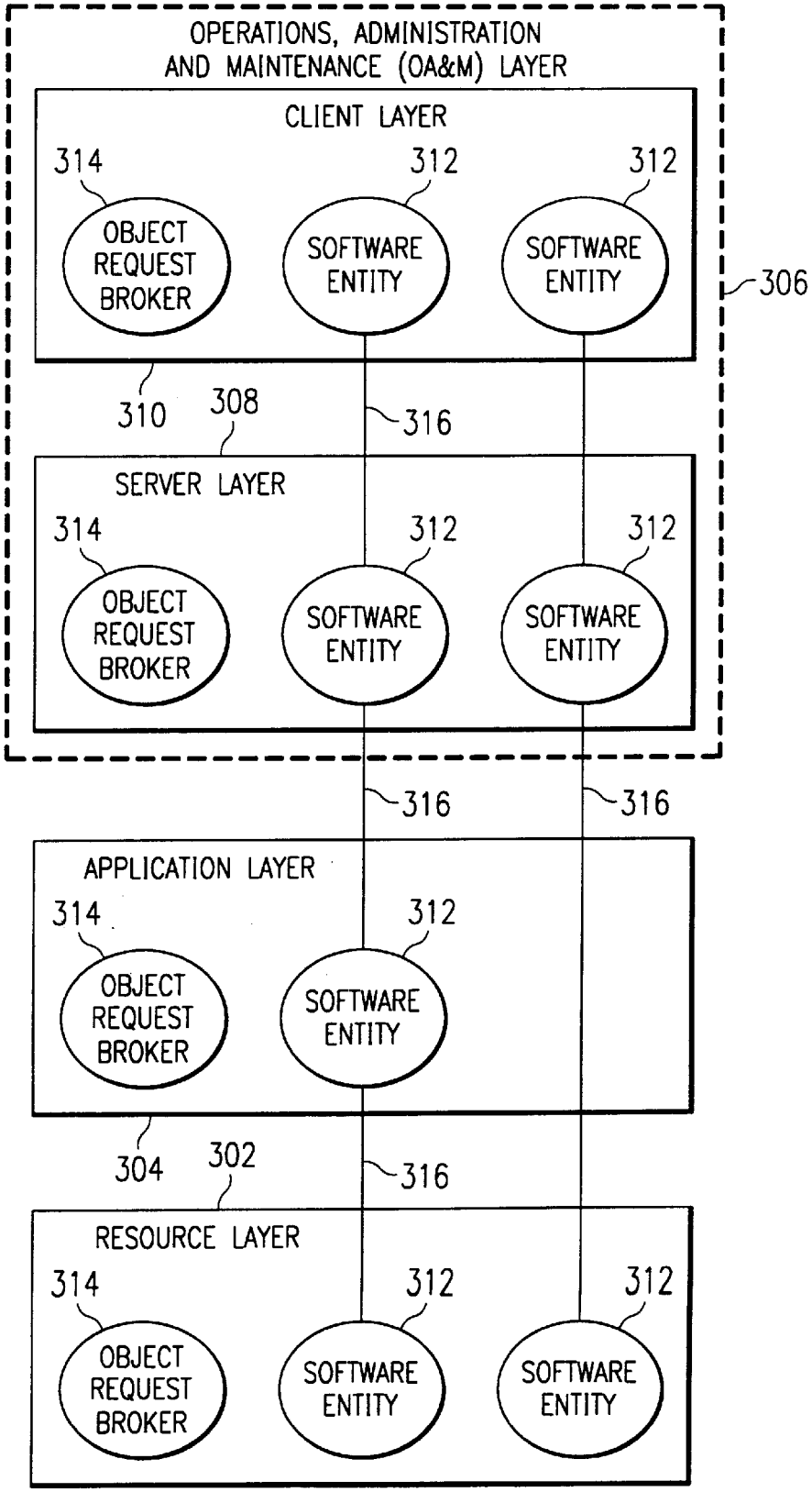
FIG. 3A is a diagram that illustrates an architecture of a telecommunications system, in accordance with an exemplary embodiment of the present invention.

FIG. 3A illustrates an architecture of the telecommunications system 100, in accordance with an exemplary embodiment of the present invention.

More than one software layer is provided in accordance with the present invention. As illustrated in FIG. 3A, three primary software layers 302–306 may be provided in accordance with an exemplary embodiment of the present inventions. Such software layers 302–306 may, for example, correspond with the resource assembly 202, call processor assembly 200 and network management system of the telecommunications system 100. For instance, the telecommunications system 100 may include a resource layer 302, an application layer 304 and an operations, administration and maintenance (abbreviated OA&M) layer 306. The resource layer 302 may function to control and administer the operation of hardware modules and components provided within the resource assembly 202, including management and provision of telephony resources and switching functions provided within the resource assembly 202. It may further control and administer communications between the application layer 304 or the OA&M layer 306 and the resource assembly 202. The application layer 304 provides specific call processing functions, such as switching related functions. As such, the application layer 304 preferably includes one or more functional elements that collectively implement one or more specific particular call processing applications in accordance with one or more standards, such as the GSM standard. An example of a call processing application consistent with the GSM standard is described below in connection with FIG. 5. Preferably, the application layer 304 isolates those functions that pertain to a particular telecommunications standard so that the application layer 304 can be readily modified to reflect changes in that standard or so that a presently implemented standard can be replaced with another standard, as discussed below in connection with FIG. 5. The OA&M layer 306 may provide a user interface to receive operations, administration and maintenance related requests and provide services in response to those requests. Such services may include: configuration management services to modify configuration information used by the resource layer 302 and application layer 304; performance management services to periodically collect and summarize system performance and traffic information; fault management services to detect, log and report failures; accounting management services to create and store billing related records; system management services to monitor and initiate tests and resets of hardware and software; and security management services to control access to the network management system 204.

The OA&M layer 306 is preferably separated into a client layer 310 and a server layer 308. Preferably, the client layer 306 provides a user interface and receives requests for the aforementioned services while the server layer 310 provides and manages requests received from the client layer 306. The client layer 306 is operable to present information, requested by the client layer 306 and provided by the server layer 308, to a user through a graphical user display. A user can adapt and modify such information. In contrast, the server layer 308 validates and causes the storage of information provided by the client layer 306, as well as forwards appropriate information to the application layer 304 and resource layer 302. The server layer 308 also supplies the client layer 306 with appropriate information to display to a user. One or more databases (not illustrated) are accessible by the server layer 308 to store information related to the services, such as configuration information that is used by the application layer 304. An example of a client layer 310 and a server layer 308 is described below in connection with FIG. 6.

One or more processors (not illustrated) are associated with each software layer 302–310. The number and type of processors associated with each software layer 302–310 may be different and should be selected based on the particular requirements of, and benefits derived by, each such layer. Similarly, software layers 302–310 may employ different programming languages and operating systems and should be selected based on the particular requirements of, and benefits derived by, each such layer.

It should be appreciated that the number of software layers 302–310, as well as the software entities 312 associated with each such layer, is of no consequence with respect to the scope of the present invention. It should further be appreciated that while the various software layers 302–310 need not be co-located, i.e. they may be stored and executed at remote locations and within different products. As such, migration of functionality is accommodated by the present invention. For example, it may become desirable for some or all of the functionality of a given layer 302–310 to be executed by one or more processors not provided within the telecommunications system 100. Such layer and its associated functionality may therefore, in accordance with the present invention, be readily migrated to hardware platform of an external system. As another example, an existing layer 302–310, such as the client layer 306, may be replaced by another application preferred by an operator of a telecommunications product. As yet another example, a particular software entity 312, such as a home location register 504 discussed below in connection with FIG. 5, may be inactivated in favor of another provided externally. The present invention therefore provides a great deal of flexibility to continually adapt and modify a telecommunications system 100 as needed or desired.

A software layer 302–310 may include one or more software entities 312. Software entities, as used herein, comprises one or more software objects that collectively model, for example, a particular component. One example of a software entity 312 is a composite software object. Software objects generally encapsulate one or more operations or methods and associated data to model various functions of, for example, a particular component and variables to reflect information about the characteristics and states of that component. Peer software objects i.e., software objects within the same layer 302–310 or entity, may be coupled by a virtual connection so that they can interact and communicate with one another. For example, one object can invoke or call an operation or method associated with another object. This is ordinarily accomplished by the sending of a message from one object (known as the originating object) requesting that a specified operation or method be carried out by another object (known as the target object). After receiving the request, a target object sends a response to the originating object. One target object may respond to the same message differently from another target object. This result is sometimes referred to as polymorphism. Objects, which include encapsulated methods, interact by exchanging messages. A message typically identifies a target object, a method of the target object and (in some cases) a set of parameters that the method requires to carry out its function. Various commercially available tools and languages may be used to create software objects, such as Smalltalk, C++ and Java. To readily create software objects, a class of objects may be defined. Classes provide a template that defines common methods and variables in a set of related objects. Different objects belonging to a class, commonly referred to as instances of a class, each include particular values for the variables of the class. Classes are specified by a message interface and an implementation of that interface. A message interface specifies, with respect to a given class of objects, those messages to which objects of the given class will respond, whereas an implementation specifies how responses to messages are carried out.

In accordance with the present invention, a given software entity 312 may form a virtual connection 316 with another entity 312, whether or not such other entity 312 is in the same software layer 302–310 as the given entity or another layer. More specifically, a virtual connection 316 is formed between an originating software object and a target software object of different software entities 312 of different software layers 302–310. A virtual connection 316 may, for example, be accomplished by sending a message from an originating software object, and receiving a response to such message from a target software object. To accomplish a virtual connection 316 between software entities 316 provided on distinct software layers 302–306, object request broker technology is preferably employed in accordance with the present invention. Object request broker technology includes those software products made pursuant to the Common Object Request Broker Architecture (abbreviated CORBA) standard and the Distributed Component Object Model (abbreviated DCOM) technology. By employing object request broker technology within the telecommunications system 100, a communications and transport mechanism is provided whereby any software entity 312 may effectively communicate with another software entity 312 regardless of the nature and environment associated with each such entity.

Object request broker technology may be considered to provide a message transport mechanism or bus that functions to provide for the formation of virtual connections 316 between software entities 312 of different software layers 302–310. More specifically, object request broker technology is operable to transport a message from an originating object of a software entity 312 in one software layer 302–310, to cause delivery of that message to a target object of a software entity 312 in another layer, and then to cause return of a response to the originating object. Use of object request broker technology therefore allows for remote messaging by providing a communications channel between remote entities 312. In other words, a software entity 312 in a given software layer 302–310 may invoke a method associated with a target object of another software entity 312 that is found in another layer. In this fashion, the target object is not made aware of the mechanisms used to communicate with it. Use of object request broker technology to facilitate communications between two software entities 312 allows for a client-server relationship between such entities wherein the originating object acts as a client and the target object acts as a server. Numerous advantages are thus gained by the use of object request broker technology to provide interoperability among the various entities 312 and software layers 302–310 of the telecommunications system 100.

One or more elements, referred to and identified herein as object request brokers 314, are preferably provided with respect to each software layer 302–310. Preferably, an object request broker 314 is provided for those software entities 312 executed by each processor. An object request broker 314 preferably comprises one or more software objects, and resides together with other software entities 312 of a given software layer 302–310. It relieves an originating object of the burden of tracking the location of remote objects to which an originating object desires to send a message. Accordingly, an object request broker 314 essentially provides a location service by which target objects can be located by originating objects. Locating a target object is preferably based on a name or numeric identifier associated with the target object, sometimes referred to as an object reference. In operation, an originating object, the object seeking to send a message, initially provides information to the object request broker 314 and requests the location of a target object and/or an operation sought to be invoked by the originating object. In turn, the object request broker 314 provides such location and/or the appropriate interface for the operation sought to be invoked, which allows an originating object to send a message to the target object. Since an originating object typically does not maintain sufficient information to directly send a message to a target object without information provided by an object request broker 314, the location of the target object is thus transparent to the originating object. Accordingly, an object request broker 314 can be said to facilitate communications between originating and target objects of different software layers 302–310.

An alternative to providing a centrally located object request broker 314 is distributing those functions that have been described above as being embodied within the object request broker 314 amongst software entities 312 or objects comprising associated with a software entity 312.

One or more proxies (not illustrated) are preferably provided with respect to an originating entity 312. A proxy is preferably a software object that acts as a local representative of a software object located in a different software layer 302–310. As such, a proxy shields an originating object from appreciating that a target object is remotely located. A proxy may represent a remote target object to an originating object of a given software layer 302–310. By using a proxy, the target object appears to the originating object as a peer object. In operation, a proxy may receive a message or request from an originating object concerning a target object and/or an operation of a target object.

A proxy may be used to provide either a static or dynamic interface to an originating object. Preferably, an originating object requests information from an object request broker 314 concerning the location of a remote target object and/or the interfaces for operations of the target object that can be invoked by the originating object. As a result of such request, a bind is performed whereby a proxy is created within the software entity 312 of the originating object and a direct communication path is formed between the proxy and the target object selected by the object request broker 314. That proxy preferably includes the various operations of the target object that can be invoked by the originating object. Upon provision of such proxy, the originating object may issue a request to that proxy to invoke one of the identified operations of the target object. In turn, that proxy relays that request to the target object. Alternatively, a proxy may redirect a message or request from an originating object to a target object of the remote software layer 302–310, provided that the proxy is provided with, and maintains, sufficient information to do so.

A proxy is preferably configured to receive a response from a target object and to transmit that response to the originating object associated with such proxy. By providing a proxy for an originating object, knowledge that a remote target object is not commonly located with the originating object is shielded from 312 the originating object or other software objects within the same software entity 312 or layer 302–310. Rather, such knowledge is limited to the proxy. A proxy is therefore interchangeable with a remote target object to which it is responsible for conveying and receiving messages. As such, the operations or methods associated with a remote target object may be incorporated within its associated proxies without adversely affecting other software objects or software entities 312 or their associated proxies.

To send a message to a target object, an originating object must know how to address the target entity 312 but not the implementation details associated with the target object, such as the programming language, operating system, processor, tools, network and other aspects associated with a target objects. Addressing a target object, and invoking an operation thereof, calls for knowledge of the specifications of a message interface of the target object. Adherence to the interface specifications allows an originating object to communicate with a target object. An object request broker 314 preferably maintains and provides (or publishes) those interfaces of a target object (sometimes referred to as being published) that can be utilized by originating objects.

An interface to a particular method or operation of a target object—sometimes referred to as a method invocation interface or message interface—is preferably defined and specified by a standard definition language. For example, a method invocation interface may be specified by use of Interface Definition Language (IDL) consistent with the CORBA standard. IDL provides an interface for a given software object, independent of programming language and operating system, to other objects and software entities 312 that are associated with a CORBA architecture. As such, it allows originating and target objects written in different programming languages and associated with different operating systems to communicate and interoperate with one another. Using IDL, a method invocation interface is specified by identifying various data related to an interface of a software object. Such data includes the object's attributes, classes from which the object inherits, exceptions raised by the object, typed events emitted by the object and the methods of the object that can be invoked by other objects, including input and output parameters and data types of those parameters.

A method invocation interface may be either static or dynamic. A static interface is defined at the time that the software entities 312 are compiled, whereas a dynamic interface is defined during run-time. For example, a proxy may provide a static interface by which a virtual connection 316 may be formed between software entities 312. Consistent with CORBA, an interface repository may be provided to store interface specifications used to construct dynamic interfaces. That interface repository may, for example, dynamically change and be accessed during run-time.

Figure 3B:
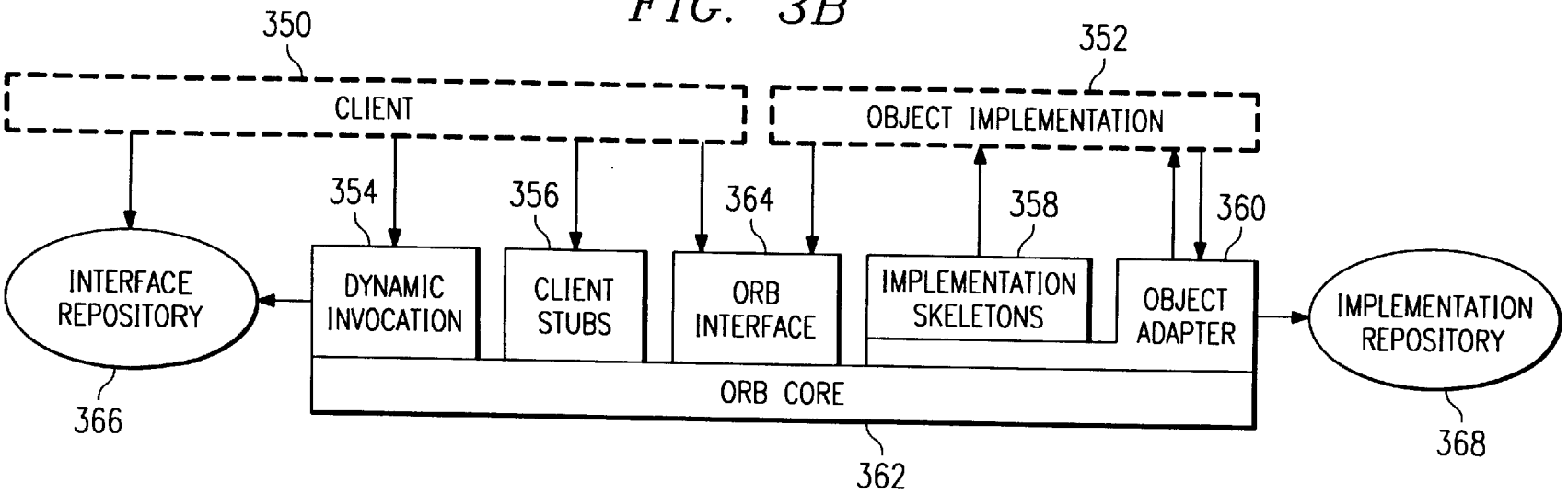
FIG. 3B is a diagram that illustrates an object request broker structure pursuant to the CORBA 2.0 standard, in accordance with an exemplary embodiment of the present invention.

FIG. 3B illustrates an object request broker structure pursuant to the CORBA 2.0 standard, in accordance with an exemplary embodiment of the present invention.

In accordance with that standard, an originating object is deemed a client 350 while the methods or services of a target or server object sought to be invoked by the client are deemed to be an object implementation 352. According to CORBA 2.0, certain elements are employed to provide an object request broker environment. One or more client stubs 354 and dynamic invocation elements 356 are utilized by a client 350. Similarly, one or more implementation skeletons 358 and object adapters 360 are utilized by an object implementation 352. Further, one or more ORB interfaces 364 are provided for use by clients 350 and object implementations 352. Such elements are preferably implemented in software and communicate with one another over an ORB core 362, which may, for example, use CORBA's 2.0 Internet Inter-ORB Protocol (IIOP) services. Other elements, such as one or more interface repositories 366 and implementation repositories 368, are also employed consistent with CORBA 2.0.

CORBA 2.0 provides for both static and dynamic programming interfaces to be provided between a client 350 (for example, an originating object) and an object implementation 352 (for example, a target object). Specifically, a client 350 may issue requests to remote object implementations 352 through either a client stub 356 or a dynamic invocation interface 354. Both client stubs 356 as well as interface repositories 366, which are utilized by dynamic invocation elements 354, are created through the use of IDL.

Client stubs 356 are provided with respect to a client 350 to provide static interfaces to object implementations 352. That is, client stubs 356 represent particular methods or operations that may be invoked by a client 350. Client stubs 356 may be precompiled using IDL and generated by an IDL compiler. Preferably, a distinct client stub 356 is provided for each method or operation invoked with respect to a given client object. Client stubs 356 thus act as proxies for a client 350, and may reside locally relative to a client 350. A client stub 356 is preferably operable to encode and decode messages and requests made by a client 350, including the method and parameters identified in a message or request, into a suitable message format that is directed to an object adapter 360 and then to an implementation skeleton 358, as discussed more fully below.

Dynamic invocation elements 354 are provided with respect to a client 350 to provide dynamic interfaces to object implementations 352. Dynamic invocation elements 354 allow for a client 350 to dynamically construct an interface to invoke methods or operations at run-time. This is in contrast to client stubs 356 which provide for a predetermined interface. Dynamic invocation elements 354 are operable to define an interface by accessing an interface repository 366, generating parameters, issuing remote calls, and obtaining results with respect to an object implementation 352. An interface repository 366 provides for interface descriptions, supported methods and required parameters with respect to remote object implementations 352 for access and use by dynamic invocation elements 354. Clients 350 may therefore dynamically access, and object implementations 352 may therefore store and update, information required to uniquely and globally identify a particular interface of a given object implementation 352 so as to allow formation of a virtual connection 316 between the client 350 and that object implementation.

An ORB interface 364 is accessible by both clients 350 and object implementations 352. An ORB interface 364 is operable to provide a distinct set of services to a client 350. Those services may include, for example, operations to return an interface type, converting an object reference to a string, as well as various management functions.

Whether a static or dynamic invocation, requests for service are transmitted to an object adapter 360. An object adapter 360 is interposed between an ORB core 362 and implementation skeletons 358, and is operable to accept requests for service on behalf of a given server object. An object adapter 360 provides a run-time environment for instantiating server objects, as well as passing requests to server objects and signing identification information to server objects (which are referred to as object references). Further, an object adapter 360 preferably registers the classes of objects it supports and their associated run-time instances with an implementation repository 368. An implementation repository 368 maintains information provided to it by an object adapter 360, and is operable to store additional information, such as trace information, audit trails, security and other administrative data.

Implementation skeletons 358 provide the interface through which a method of an object implementation 352 receives a request, which originated either from a client stub 356 or a dynamic invocation element 354. Object implementations 352 thus receive requests through implementation skeletons 358 without knowledge of the invocation approach, i.e., whether through a static or dynamic interface. Since both static and dynamic invocations have the same message semantics in accordance with CORBA 2.0, messages provided to an object implementation 352 typically do not indicate whether such messages derived from a client stub 356 or a dynamic invocation element 354. Implementation skeletons 358 correspond with client stubs 356 and dynamic invocation elements 354. That is, implementation skeletons 358 can provide for either a static interface or dynamic interface to an object implementation 352. Implementation skeletons 358 may include static skeletons (not illustrated) and dynamic skeleton invocation elements (also not illustrated). Static skeletons, like client stubs 356 with respect to clients 350, provide static interfaces to messages exported by an object implementation 352. These skeletons, like client stubs 356, are created using an IDL compiler. Dynamic skeleton invocation elements provide a run-time binding mechanism for object implementations 352 that do not have IDL-compiled static skeletons. A dynamic skeleton invocation element thus analyzes the parameter values of an incoming message to determine the target entity and method, and direct the message to the corresponding object implementation 352. As such, a dynamic skeleton invocation element is the server equivalent of the dynamic invocation element 354.

While FIG. 3B and its associated description illustrate and describe a particular implementation that can be used to provide a suitable object request broker environment consistent with the present invention, it should be appreciated and understood that such implementation is exemplary and that other implementations and variations may also be used within the scope and spirit of the present invention.

Figure 4:
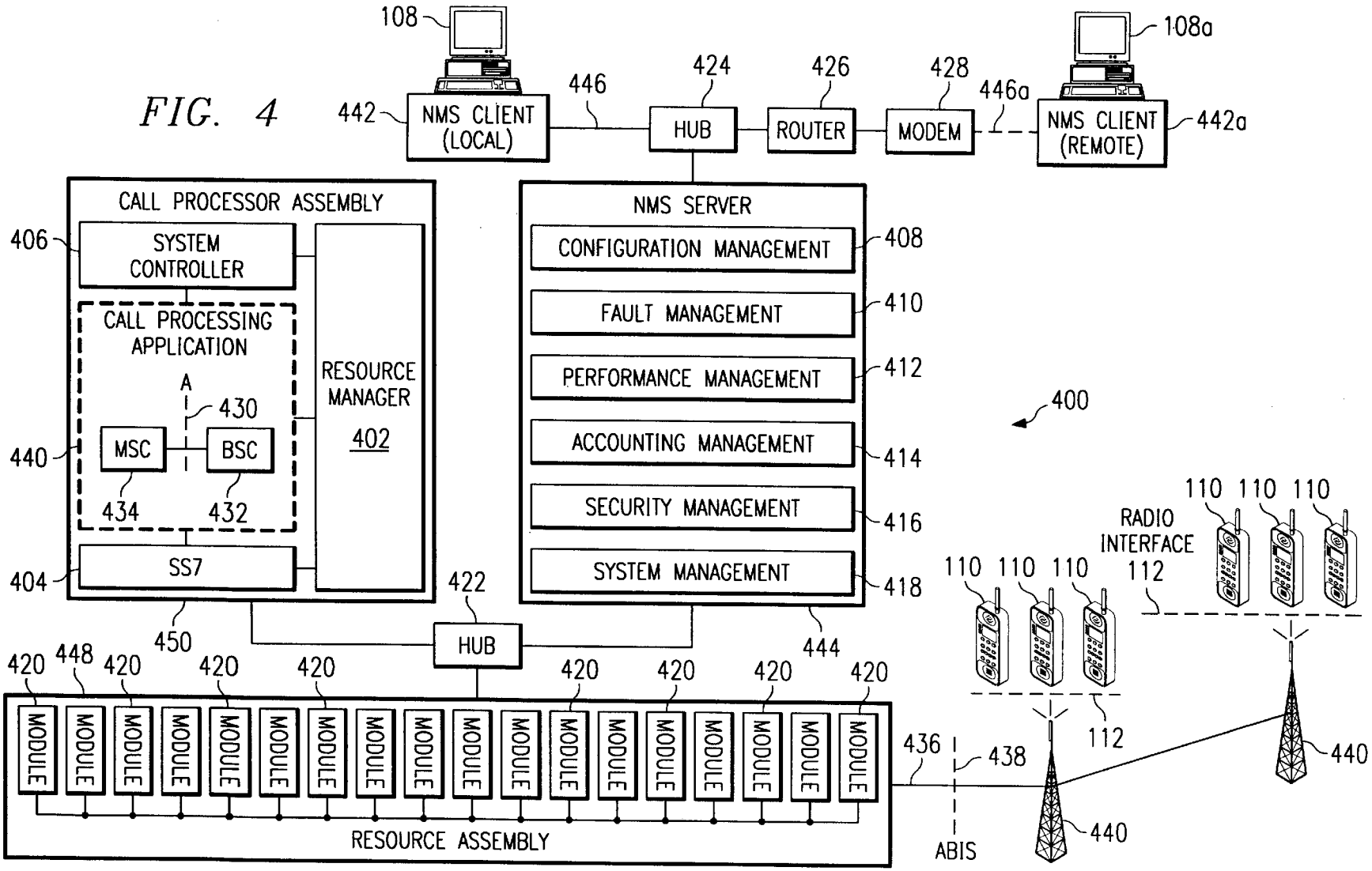
FIG. 4 is a diagram that illustrates a telecommunications system, designed consistent with the GSM standard and in accordance with an exemplary embodiment of the present invention.

FIG. 4 illustrates a telecommunications system 400, designed consistent with the GSM standard and in accordance with an exemplary embodiment of the present invention.

In accordance with the GSM standard, one or more base transceiver stations 440 are provided to communicate with subscriber units 110 over a radio interface 112. Such base transceiver stations 440 are connected to the resource assembly 448 through a link 436, which provides one or more suitable transmission channels. Digital representations of speech or data information are transmitted over the link 436 at a predetermined transmission rate. Such link 436 may, for example, be an E1 or T1 telecommunications line.

The interface 438 between base transceiver stations 440 and a base station controller 432 is, pursuant to the GSM standard, known as the Abis interface. The Abis interface 438 provides message flow between a base station controller 432 and base transceiver stations 440, and also manages message flow between subscriber units 110 and other network elements. The Abis interface 438 is thus interposed between base transceiver stations 440 and the telecommunications system 400 itself. Digital representations of speech or data information are transmitted through the Abis interface 438, that is, between the telecommunications system 400 and the base transceiver stations 440, at a predetermined transmission rate. For example, digital representations of speech or data information may be transmitted over the link 120 connecting the base transceiver stations at a rate of 16,0000 bits per second.

The call processor assembly 450 preferably includes a call processing application 440 which includes, among other elements, a base station controller 432 (abbreviated BSC) and a mobile switching center 434 (abbreviated MSC), which is sometimes also referred to as a mobile services switching center. Signaling and voice data is exchanged between the interface between the base station controller 432 and mobile station controller 434, known as the A interface 430.

The base station controller 432 is responsible for management of the base transceiver stations 440 and their radio interfaces 112, including the allocation and release of radio channels associated with a given radio interface 112 and management of handovers from one base transceiver station 112 to another base transceiver station 112. The base station controller 432 manages the base transceiver stations 440 and their radio interfaces 112 through the allocation, release and handover of radio transmission channels. The base station controller 432 may carry out various procedures that relate to call connection tasks. For example, the base station controller 432 may be responsible for system information broadcasting, subscriber paging, immediate traffic channel assignment, subsequent traffic channel assignment, call handover, radio connection and release, connection failure detection and reporting, and power capability indication reporting. The base station controller 432 may also be responsible for management of both the Abis interface 438 and the A interface 430.

The mobile switching center 434 coordinates the allocation and routing of calls involving the subscriber units 110 of the telecommunications system 400 by, among other things, receiving dialed digits, interpreting call processing tones and providing routing paths. For example, the mobile switching center 434 is operable to process a service request from a subscriber unit 110, and route a corresponding call to the designated switched network 106, a mobile network 104 or to another subscriber unit 110. Similarly, the mobile switching center 434 is operable to process a service request from a mobile network 104 or switched network 106, and route a corresponding call to a designated subscriber unit 110. The mobile switching center 434 is primarily responsible for mobility management, call control and trunking, such as coordinating the setting-up and termination of calls to and from subscriber units 110. Additionally, it provides all of the functionality needed to handle mobile subscribers units 100 through location updating, handover and call delivery.

The interface between the base station controller 432 and the mobile switching center 434 is, pursuant to the GSM standard, known as the A interface 430. The A interface 430 provides the link for managing traffic channels/transcoders, and also provides the mobile switching center 434 with access to base transceiver stations 112 for message flow with the subscriber units 110. The Base Station Subsystem Management Application Part (abbreviated BSSMAP) protocol may be employed to transmit connection-related messages and paging messages between the mobile switching center 434 and base station controller 432. Preferably, the base station controller 432 and the mobile switching center 434 are implemented as distinct entities, such as separate software objects that communicate with one another so that the A interface 430 is logically discernible.

In addition to the call processing application 440, the call processor assembly 450 preferably includes several other elements, namely, a resource manager 402, a SS7 element 404 and a system controller 406. While the resource manager 402 is preferably included in the call processor assembly 450, it may also be included in the resource assembly 448 within the scope of the present invention.

Management and allocation of resources provided by the resource assembly 448 with respect to the call processor assembly 450 is carried out by the resource manager 402. That is, the resource manager 402 acts as the bridge between the call processing application 440 and the resource assembly 448 by enabling different elements of the call processing application 440 to interface with resources of the resource assembly 448. Preferably, the resource manager 402 also provides an interface to resources of the resource assembly 448 for the SS7 element 404 as well as remote elements, such as the system controller 406 and various elements of the network management system 204.

The resource manager 402 is preferably implemented in software as a software entity that comprises one or more software objects. It preferably interfaces with other software entities 312 through the use of object request broker technology. In accordance with an exemplary embodiment, the resource manager 402 provides a proxy for other software entities 312 in which the resource manager 402 may seek to invoke a method or operation. Similarly, a proxy may be associated with a software entity 312 other than the resource manager 402 which may seek to invoke a method or operation associated with the resource manager 402. An interface is preferably defined between each such proxy to establish acceptable messages and responses that can be exchanged over the defined interface so as to allow a virtual connection to be formed therebetween. The SS7 element 404 provides the logic needed to provide SS7 signaling functionality for SS7 connectivity to a switched network 106. It is responsible for performing various functions and interfaces associated with the various parts and protocols that are included within SS7 signals. Further details of the resource manager 402 and the SS7 element 404 are provided in the U.S. patent application Ser. No. 09/026,190 designated by DSC Case No. 835-00 and Attorney Docket No. 24194000.181, entitled "Resource Management Sub-System of a Telecommunications Switching System," naming Howard L. Andersen and Scott D. Hoffpauir as inventors, filed concurrently with the instant patent application, and which is incorporated by reference herein for all purposes.

The system controller 406 is responsible for ensuring that the call processor assembly 450 is operating properly by periodically testing elements of the call processor assembly 450. A successful test of an element of the call processor assembly 450 may comprise, for example, observing a predetermined response from the element after sending a predetermined message to the element. This is sometimes referred to as "pinging" an element.

The NMS server 444 includes several elements for configuring and managing elements of the call processor assembly 450 and resources of the resource assembly 448. Specifically, the NMS server 444 includes the following elements: configuration management 408, fault management 410, performance management 412, accounting management 414, security management 416, and system management 418. Those elements are operable to provide operations, administration and maintenance related services, and preferably include one or more logical servers.

The configuration management element 408 includes one or more servers to provide services necessary to administer the configurable attributes of the main functional elements associated with the call processing application 440, the resource manager 402 and the SS7 element 404. As such, the configuration management element 408 is operable to modify configuration information associated with the call processing application 440, such as administration of subscriber databases, as well as the configuration of specific elements of the call processing application, such as the base station controller 432 and mobile switching center 434. Servers of the configuration management element 408 preferably contain software objects that retain attribute information so as to allow an operator to configure the corresponding functional component of the call processing application 440, the resource manager and the SS7 element 404. The fault management element 410 provides for the detection, logging and reporting of alarms, errors, and selected events from the call processor assembly 450 and the resource assembly 448. The performance management element 412 provides for the periodic collection and analysis of system performance and traffic information from the resource assembly 448 and call processing application 440. The accounting management element 414 attends to the creation and storage of billing records for calls originated or terminated to a subscriber unit 110, as well as calls forwarded to or from a subscriber unit 110. Such billing records are in the form of a call data record. The security management element 416 provides for discriminatory access to operation, administration and maintenance operations based on the given operator of the network management system 204. Various security levels are defined that determine the operations that are available to a given operator. The system management element 418 supports the start-up and recovery functions of the telecommunications system 400. It is operable to initiate tests to assess the operation of various elements and resources, and to cause the reset of such elements and resources in the event of incorrect operation.

Multiple modules 420 are provided within the resource assembly 448. Preferably, such modules are replaceable line cards that are interconnected to one another over a backplane. Particular resources are preferably provided on distinct modules 420. Alternatively, particular resources are distributed over such modules 420.

Preferably, an ethernet hub 422 allows the call processor assembly 450, the resource assembly 448 and the NMS server 444 to communicate with one another. Another ethernet hub 424 is provided to allow the NMS server 444 to communicate with both the local NMS client 442 and the remote NMS client 442*a*. That ethernet hub 424 connects to the local NMS client 442 over a wireline connection 446. That hub 424 also connects to a router 426 that further connects to a modem 428, which, in turn, connects to the remote NMS client 442*a* over the modem link 446*a*. Further details of the NMS client 442 and NMS server 444 are set forth in U.S. utility patent application designated as DSC Case No. 833-00 and Attorney Docket No. 24194000.179, entitled "Network Management System Server and Method for Operation," naming Scott D. Hoffpauir as inventor, which was filed concurrently with the instant patent application, and which is incorporated by reference herein for all purposes.

While the telecommunications system 400 of FIG. 4 is designed and constructed pursuant to the technical and functional specifications provided for in the current GSM standard, it should be appreciated and understood that the present invention should not be understood or construed to be so limited. Rather, the present invention is equally applicable to use with technologies and applications other than GSM, including, among others, PCS, CDMA and TDMA technologies, as well as those associated with wireline systems, such as tandem switching systems.

Figure 5:
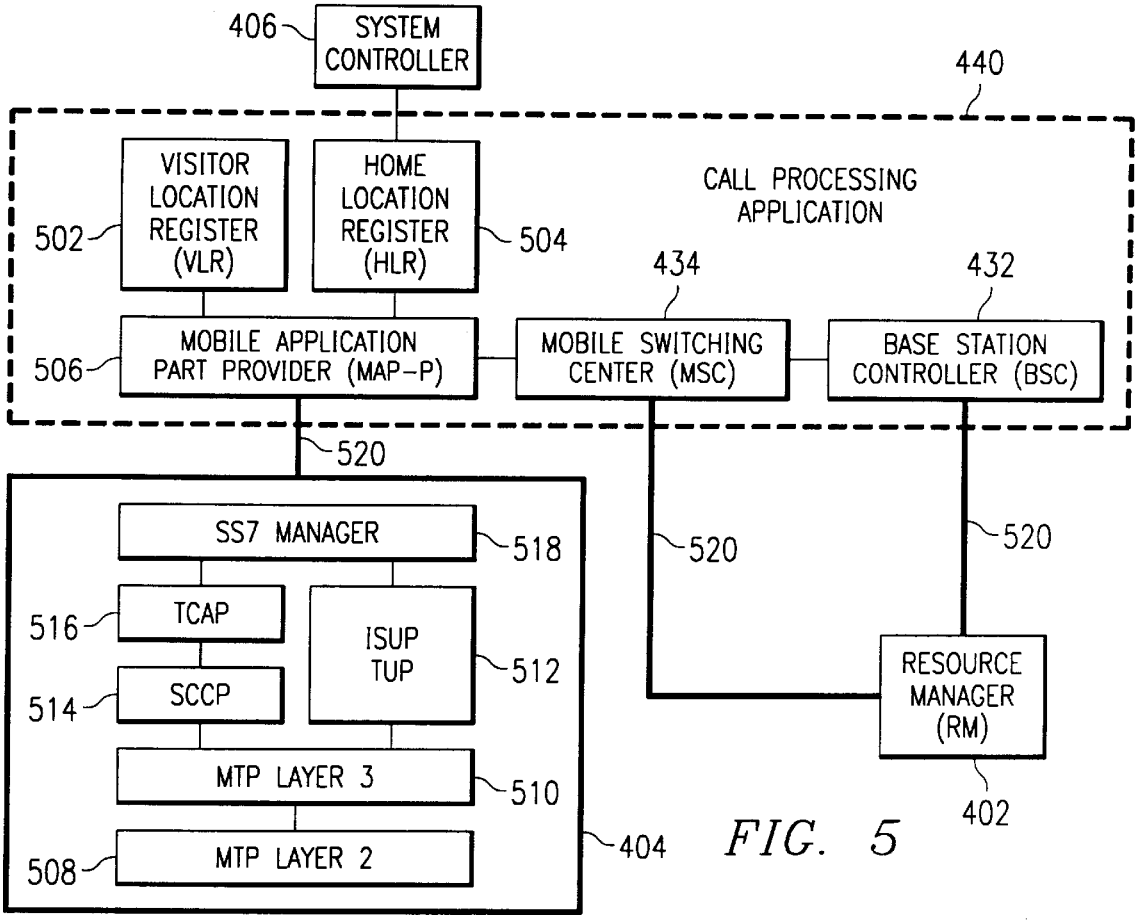
FIG. 5 is a diagram that illustrates various elements included within a call processor assembly, designed consistent with the GSM standard and in accordance with an exemplary embodiment of the present invention.

FIG. 5 illustrates various elements included within the call processor assembly 450, designed consistent with the GSM standard and in accordance with an exemplary embodiment of the present invention.

In addition to the base station controller 432 and mobile switching center 434, the call processing application 440 provides other elements that take part in processing calls directed to, or initiated by, the subscriber units 110. Specifically, the call processing application 440 includes a visitor location register 502 (abbreviated VLR), a home location register 504 (abbreviated HLR) and a mobile application part provider 506 (abbreviated MAP-P). Such elements are preferably implemented as distinct software entities.

Both the home location register 504 and the visitor location register 502 provide a database function for subscriber related information. Such subscriber related information includes subscription information for such subscribers, such as the service options to be provided to each subscriber (for example, voice mail, call waiting, call forwarding, etc.), preferences and option selections supplied by the subscribers (for example, call forwarding numbers or criteria), and the location of those subscribers. The home location register 504 provides that database function for certain set of subscribers, namely, those subscribers enrolled for service with the operator of the telecommunications system 400 or otherwise associated with the telecommunications system 400. In contrast, the visitor location register 502 provides a database function for those subscribers known to be situated in the area serviced by the telecommunications system 400 and its associated base transceiver stations 440. Those subscribers would therefore include roaming subscribers, i.e., subscribers associated with another service provider or telecommunications system for which subscriber related information is maintained externally but not in the home location register 504 of the telecommunications system 400. To obtain subscriber related information about a roaming subscriber, the visitor location register 502 of a telecommunications system 400 would therefore have to access the home location register of another operator or telecommunications system. Such access would, in turn, provide that external home location register with knowledge of the location of the roaming subscriber.

It is preferable to form distinct elements for the various elements provided for in the call processing application 440. By providing distinct elements, such as software entities, functionality is encapsulated and isolated from other elements, which allows for such elements to be readily modified, removed or interfaced with other elements.

SS7 type signaling is provided to the telecommunications system 400 as a transport mechanism for mobile application part dialogues and out-of-band signaling with other switches. That signaling includes several parts, each having a distinct protocol. Specifically, SS7 signals include: (a) a lower layer Message Transfer Part (abbreviated MTP), which applies to call related or non-call related signaling; (b) a Signaling Connection Control Part (abbreviated SCCP) and a Transaction Capabilities Application Part (abbreviated TCAP), which apply to non-call related signaling and (c) TUP and ISUP, which apply to call related signaling. The SS7 element 404 includes elements that correspond with the aforementioned parts, namely, a MTP Layer 2 element 508, a MTP Layer 3 element 510, and ISUP/TUP element 512, a SCCP element 514 and a TCAP element 516. Through these elements, the SS7 element 404 provides functionality related to each of those elements 508–516, including global title translations and terrestrial and satellite links.

The SS7 manager 518 provides for management and cooperation with respect to the other elements of the SS7 element 404 and other elements of the call processor assembly 450, such as the resource manager 402, the mobile application part provider 506 and the mobile switching center 434.

The mobile application part provider 506 is the logical link between the visitor location register 502 and home a location register 504. As such, it is directly associated with the visitor location register 502 and the home location register 504 and provides the dialogues through which they communicate with each other and with other elements. The mobile application part provider 506 provides a protocol based on the services provided by the SS7 element 404 for non-call related signaling (specifically, TCAP) for use by other elements. The specific nature of the protocol provided by the mobile application part provider 506 is dependent on the identity of such elements, which is sometimes referred to as the MAP protocol interface. For example, messages between the visitor location register 502 and an external home location register utilize one MAP protocol interface while messages between the home location register 504 and an external visitor location register utilize another MAP protocol interface. Preferably, authentication functions are integrated within the home location register 504 to provide authentication information to the home location register 504 for validating subscribers requesting service from the telecommunications system 400. Further details of mobile application part provider 506 are set forth in the U.S. patent application Ser. No. 09/026,230 designated by DSC Case No. 852-00 and Attorney Docket No. 24194000.197, entitled "Application Provider and Method for Communication," naming Scott D. Hoffpauir and Steve B. Liao as inventors, which was filed concurrently with the instant patent application, and which is incorporated by reference herein for all purposes.

The call processing application 440 is preferably implemented as a distinct software layer, such as an application layer 304 that is discussed above in connection with FIG. 3A. Further, each of the elements 432–434, 502–506 of the call processing application 440 are preferably implemented as distinct software entities. As such, virtual connections 520 are preferably formed between the base station controller 432 and the resource manager 448, as well as between a mobile switching center 434 and the resource manager 448 by employing object request broker technology and associated techniques. Likewise, virtual connections 520 are also preferably formed between the mobile application part provider 506 and the SS7 element 404.

Wireless telecommunications systems may employ various types of radio interface technology, such as, for example, TDMA, CDMA or FDMA technologies. TDMA technology allows for several subscriber units 110 to communicate simultaneously over a single radio carrier frequency by dividing a signal into time slots, which can be dedicated or dynamically assigned. Accordingly, TDMA systems have narrowband voice or traffic radio channels but can have wideband radio signals. Digital techniques are employed at base stations and in subscriber units 110 to subdivide time on each channel into timeslots. Like the above described GSM telecommunications system 400, systems that employ TDMA technology typically include, for example, a home location register, a visitor location register and a mobile switching center. Such TDMA systems may also include a radio controller. Several standards have been created with respect to wireless telecommunications TDMA systems employing TDMA technology. Such standards include Interim Standard 54 (abbreviated IS-54) and Interim Standard 136 (abbreviated IS-136) by the Telecommunications Industry Association and the Electronic Industries Association, as well as the Global System for Mobile Communication (GSM) standard. Variants of the GSM standard, which also use TDMA technology, include the PCS-1900 standard for North America and the DSC-1800 standard. CDMA technologies typically divide the radio spectrum into wideband digital radio signals with each signal waveform carrying several different coded channels. Coded channels are each identified by a unique pseudo-random noise code. Digital receivers separate the channels by matching signals with the proper pseudo-random noise code sequence. Like the above described GSM telecommunications system 400, telecommunications systems that employ CDMA technology typically include, for example, a home location register, a visitor location register and a mobile switching center. Several standards presently exist with respect to wireless telecommunications systems that employ CDMA technology, such as, for example, Interim Standard 95 (abbreviated IS-95), Interim Standard 41 (abbreviated IS-41) and Interim Standard 634 (abbreviated IS-634) by the Telecommunications Industry Association and Electronic Industries Association.

Operations carried out by the call processing application 440 preferably include substantially all of the functionality that is unique and specifically associated with a particular standard, such as the GSM standard. In doing so, and by implementing the call processor application 440 as a distinct software layer 302–310 having distinct software entities 312, such unique functionality is isolated and can be readily modified by adapting the software entities 312 found in the call processing application 440. Further, a given standard specific call processing application 440 can be readily replaced by another standard specific application.

For instance, a call processing application designed consistent with the GSM standard can be modified to provide, or replaced with, a call processing application consistent with the CDMA standard. Such modifications or replacements are facilitated by the provision of software entities 312 for the various elements that comprise the call processing application 440. As a specific example, consider the call processing application 440 of FIG. 4, which is designed consistent with the GSM standard and in accordance with an exemplary embodiment of the present invention. That call processing application 440 can readily be reconfigured to be consistent with the CDMA technologies and standards. Such modifications would require, for example, that the mobile application part provider 506, visitor location register 502 and home location register 504 be reconfigured to be consistent with the protocol specified by the IS-41 standard, and that the base station controller 432 be reconfigured to be consistent with the protocol specified by IS-634 standard, and certain other modifications. Corresponding changes would also likely be required with respect to configuration management element 408 and its associated client elements. No substantial modifications would be required to the resource assembly 202 or the software associated with it, such as the resource manager 448. Defined interfaces between the software entities 312 of the call processing application 440 and other software layers, which may be provided by an object request broker 314, would require only minor modifications.

Figure 6:
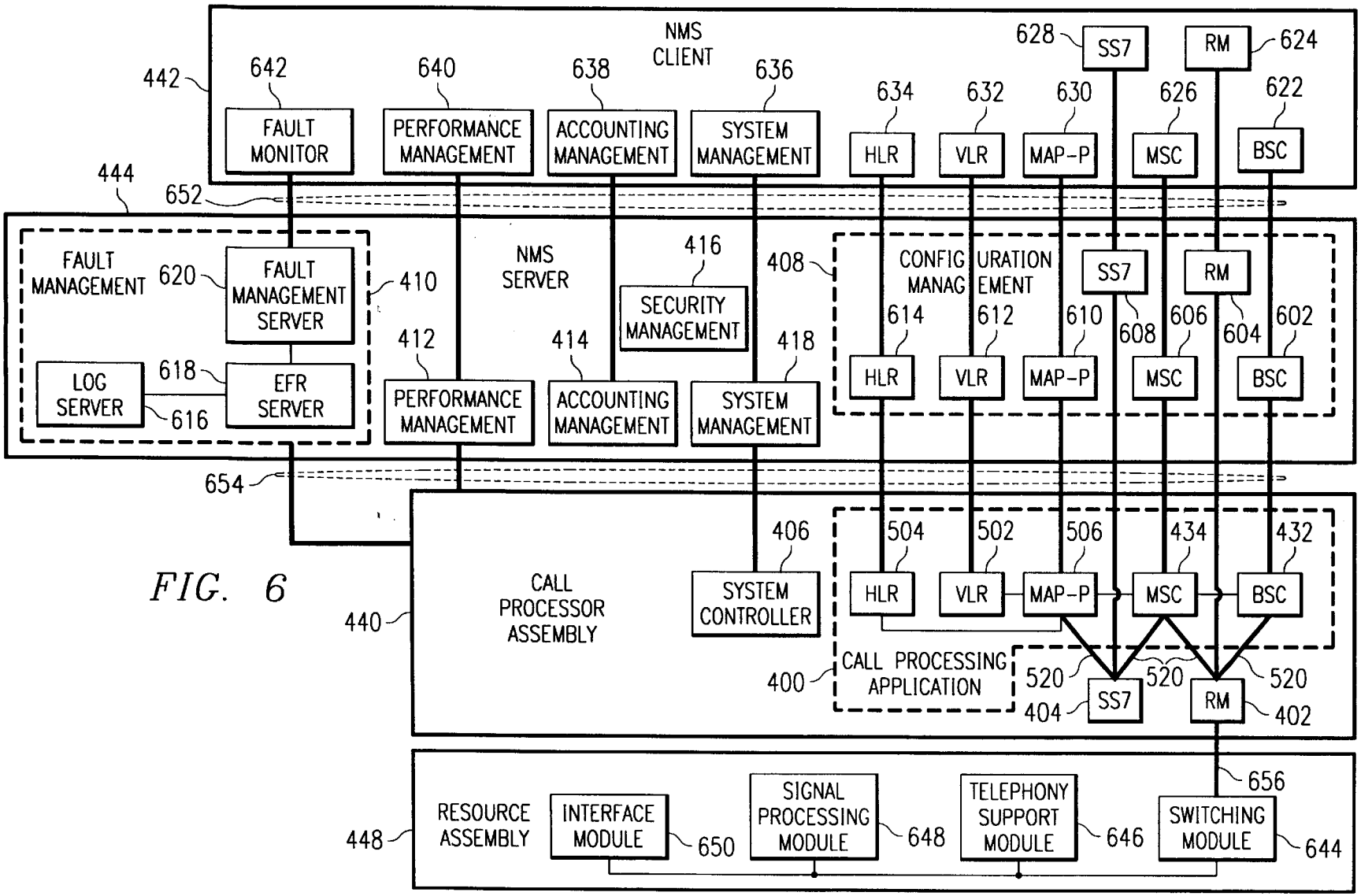
FIG. 6 is a diagram that more specifically illustrates the various elements and resources, and connections provided therebetween, of a telecommunications system, designed consistent with the GSM standard and in accordance with an exemplary embodiment of the present invention.

FIG. 6 more specifically illustrates various elements of the NMS client 442 and NMS server 444 and resources of the resource assembly 448, designed consistent with the GSM standard and in accordance with an exemplary embodiment of the present invention.

As illustrated in FIG. 6, the resource assembly 448 preferably includes a switching module 644, a telephony support module 646, a signal processing module 648 and an interface module 650. Each of those modules preferably include software and communicate with the resource manager 402 of the call processor assembly 450. As discussed more fully with respect to FIG. 7, each of those modules 644–650 preferably include specific resources that can be employed by the call processor assembly 450. Alternatively, specific resources may be distributed amongst the various modules 420. It should therefore be recognized and appreciated that the allocation of resources within the resource assembly 448 is not pertinent to the scope of the present invention.

The software architecture of the telecommunications system 400 is preferably based on object oriented software engineering technology, and the use of managed objects provided within the network management system 204. Managed objects are provided to support system logical attributes and administrative functions. Managed objects model the various functional, hardware, and interface components and subcomponents associated with the telecommunications system 400. Such software may also model the functional procedures performed by physical components. Managed objects can be created, modified, and deleted by an operator.

Preferably, the NMS server 444 includes a set of elements, which contain managed objects, that communicate with corresponding set of elements of the NMS client 442. Operators of the NMS client 442 can cause the retrieval and display of a managed object of the NMS server 444, which can then be modified by the operator. Elements of the NMS server 444 and NMS client 422, which are discussed more fully below, are preferably implemented as software entities.

There is provided elements resident within the NMS server 444 and the NMS client 442 that correspond to those functional elements provided in the call processing application 440, as well as the resource manager 402 and the SS7 element 404. Namely, the configuration management element 408 of the NMS server 444 preferably includes a BSC server 602, a RM server 604, a MSC server 606, a SS7 server 608, a MAP-P server 610, a VLR server 612 and a HLR server 614. Similarly, the NMS client 442 preferably includes a BSC client 622, a RM client 624, a MSC client 626, a SS7 client 628, a MAP-P client 630, a VLR client 632 and a HLR client 634. Such NMS client elements 622–634 are operable to provide a graphical user interface to, and receive configuration information from, an operator with respect to the associated elements of the call processor assembly 450. Such NMS server elements 602–614 are responsible for validating and storing the configuration information from such NMS client elements 622–634 for use by elements of the call processor assembly 450.

For example, an operator can make changes to reflect the addition or removal of hardware components or modifications to their operational parameters, changes to reflect the addition or removal of subscribers and to subscriber service profiles, and modify translation tables of the mobile switching center 434. Changes made by an operator are sent to the appropriate server elements of the NMS server 444 which, in turn, update local data base, notify all peer elements of the call processing application 408 of those changes, and report the completion status of the change request to the operator.

The system management server 418 of the NMS server 442 supports the start-up and recovery functions of the telecommunications system. Preferably, it is responsible for the sequential, automatic start-up of other NMS server elements by reading system start-up files and periodically polling such elements to verify their operational status and automatically restarting failed elements. It periodically requests that functional elements of the telecommunications system 400 update their stored configuration files to support system recovery. This ensures the availability of start-up files that will allow the system processors to restart at a known configuration state following a shutdown or reset. The system management client 636 of the NMS client 442 provides an operator with a list of elements residing in the telecommunications system 400, the software version and status of such elements. The operator is also provided with the ability to start, stop or query the status of individual servers through that client element 636.

The security management server 416 is preferably responsible for validating operator log-in information and restricting access to certain operations based on the operator's access class. It may also be responsible for management of user identification, passwords, and access levels.

An accounting management server 414 and a corresponding accounting management client 638 are preferably respectively provided within the NMS client 442 and NMS server 444. Billing records, in the form of call data records, are reported from the accounting management server 414, which stores those records on a database associated with the NMS server 444. Such billing records may also be transferred from the accounting management server 414 to the accounting management client 638 for storage with an associated memory.

A performance management server 412 and a corresponding performance management client 640 are preferably respectively provided in the NMS client 442 and the NMS server 444. The performance management server element 412 polls the call processing application 440 for function-specific performance measurements, and generates reports and statistics based on those measurements. Such reports and statistics may be presented for display by the performance management client 640.

Alarms and fault-related events are routed from an event filtering and reporting (abbreviated EFR) server 618 to the NMS client 442 for display and to the log server 616 for storage and later processing. The NMS client 442 includes a filtering and reporting mechanism, the fault monitor 642, that allows an operator to tailor alarm, event, and state change reporting to meet specific needs.

The fault monitor 642 includes browsers that provide one or more operators with current alarm, event, alarm and state change information and maintains a consistent view of network alarm conditions. Real-time notifications are forwarded to the fault monitor from the EFR server 618. An operator has the ability to filter these notifications (messages) based on their type and severity level.

The EFR server 618 provides common services that support various elements of the NMS client. The EFR server 618 receives real-time event notifications, such as alarms, test results and billing records, generated by the call processor assembly 450 and resource assembly and other elements of the NMS server 444. The EFR server 618 is operable to filter them, and then route them to certain destinations within the telecommunications system 400.

The log control server 616 is responsible for logging functions. As such, it receives various alarm, event, and state change notifications from the EFR server 618 and stores the information to a database associated with the NMS client 442.

The call processing application 440, the NMS client 442 and the NMS server 444 are preferably implemented as distinct software layers. Further, the NMS client elements 622–634, performance management server 412, accounting management server 414, security management server 416, system management server 418, system controller 406, SS7 element 404, resource manager 448, elements provided in the call processing application 440, as well as the configuration management 408 and fault management 410 elements, are preferably implemented as software entities. As such, virtual connections 652 are preferably formed between the software entities of the NMS client 442 and corresponding software entities of the NMS server 444 by employing object request broker technology and associated techniques. Similarly, virtual connections 654 are preferably formed between software entities of the configuration management element 408 and corresponding software entities of the call processing application 440, between the system management 418 and system controller 406 elements, as well as between the EFR server 618 and performance management server 412 and various software entities of the call processor assembly 450. Virtual connections 656 are also preferably formed between the resource manager 448 and various software entities of the resource assembly 448.

Figure 7:
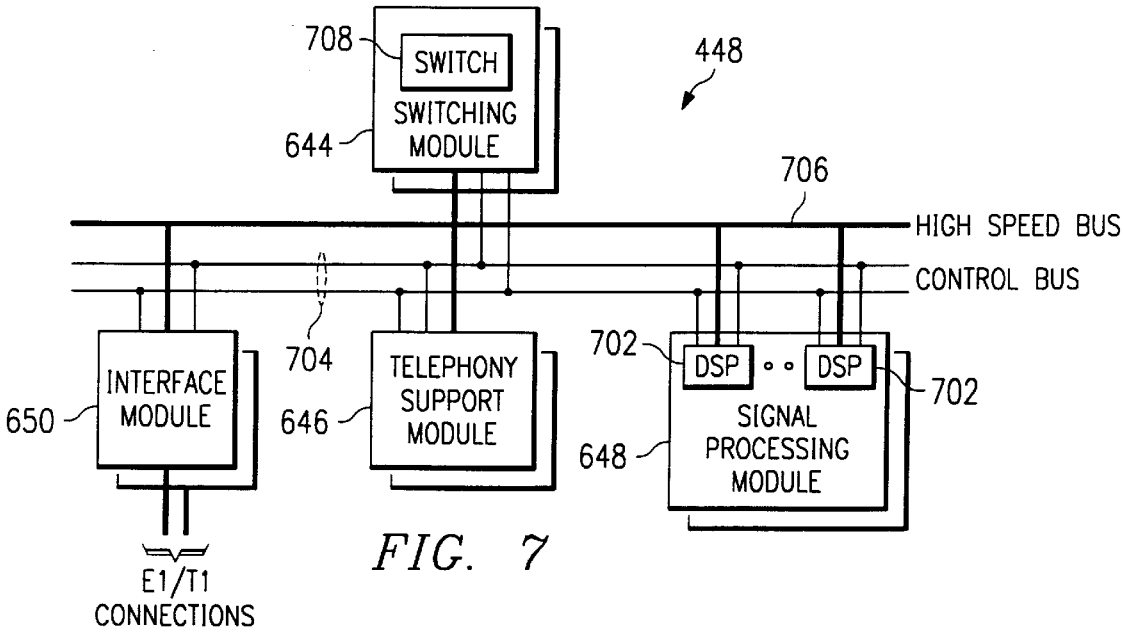
FIG. 7 is a diagram that illustrates various modules of a resource assembly, designed consistent with the GSM standard and in accordance with an exemplary embodiment of the present invention.

FIG. 7 illustrates various modules 420 of the resource assembly 448, designed consistent with the GSM standard and in accordance with an exemplary embodiment of the present invention. In accordance with an exemplary embodiment, one or more switching modules 644, interface modules 650, telephony support modules 646 and signal processing modules 648 are provided within a resource assembly 448. The interface modules 650, signal processing modules 648 and telephony support modules 646 are coupled through one or more of the switching modules 644. Control information is provided by a switching module 644 to other modules over the redundant control bus 704. Data is provided by a switching module 644 to other modules over a high speed bus 706.

A switching module 644 may be implemented in software, hardware or a suitable combination of software and hardware. A switching module 644 preferably performs switching operations, clock operations, and local communications between resources of the resource assembly 448 of the telecommunications system 400. These operations may be performed using pulse code modulation switching and data transfer techniques, Link Access Protocol on the D Channel (abbreviated LAP-D) communications and ethernet interface communications.

A switch 708 preferably resides within a switching module 644 to perform the switching functions and operations. That switch 708 may be a timeslot switch having a memory timeslot matrix to make required timeslot cross-connections within the telecommunications system 400. The switch 708 functions to set up and tear down both simplex and duplex connections between two specified channels, which may represent a call or other useful connections. For example, the switch 708 may cause a channel to connect a channel (provided by, for example, a base transceiver station 440 or a switched network 106) to a call progress tone or a voice announcement. Further, the switch 708 should be operable to set up system defined connections upon power up and reset as well as connections for the testing of timeslots when not in use. Timeslots are preferably provided to the timeslot switch via the high speed bus 706.

A switching module 644 may also, for example, include suitable digital data processing devices, a processor, random access memory and other devices. Preferably, each switching module 644 runs a suitable operating system, and include one or more pulse code modulation bus interfaces, one or more High Level Data Link Controller (abbreviated HDLC) control bus interfaces, one or more ethernet interfaces, and an arbitration bus interface to other switching modules 644.

A telephony support module 646 may be implemented in software, hardware or a suitable combination of software and hardware. A telephony support module 646 may, for example, provide tone generation, digit transceiver functions, and digitized announcements for the telecommunications system 400. Telephony support modules 646 may also provide call setup functions, such as digit collection and out-pulsing, and call completion functions, such as digitized announcement generation and call supervisory tone generation. A telephony support module 646 may, for example, include suitable telecommunications data processing equipment, such as a processor, random access memory, one or more redundant High Level Data Link Controller bus interfaces, one or more pulse code modulation buses, and an arbitration bus for establishing active telephony support module 646 status. Preferably, a single telephony support module 646 provides all required functionality for the telecommunications system 400, and one or more additional telephony support modules 646 are used to provide redundancy in the event of component failure.

An interface module 650 is an interface device that is used to interface a suitable number of telecommunications lines that carry data in a predetermined format, such as an E1 data format, with the telecommunications system 400. Interface modules 650 provide the physical interface between the telecommunications system 400 and other equipment, a switched network 106 and base transceiver stations 440. Interface modules 650 also support in-band trunk signaling for DSO data channels that are configured for channel associated signaling, and transmit data to and receive data from a signal processing module 648. An interface module 650 may be implemented in software, hardware or a suitable combination of software and hardware. For example, an interface module 650 may include suitable data processing equipment, such as a processor, random access memory, up to four E1 ports, redundant High Level Data Link Controller bus interfaces, and pulse code modulation bus interfaces.

A signal processing module 648 is preferably used to provide an interface between a call processor assembly 450 and a signaling system. For example, signaling data may be received from a data transmission channel from the switched network 106, and may be switched to another data transmission channel, such as an E1 telecommunications channel, from an interface module 650 to a signal processing module 648 by a switching module 644. A signal processing module 648 is also preferably employed to perform transcoding and rate adaption functions, such as converting from a wireless system speech encoding format to a pulse code modulation data format, as well as other functions, such as echo cancellation functions. For example, signal processing modules 648 may be employed by telecommunications system 400 to convert data from the GSM data format to another format, such as the pulse code modulation data format.

One or more digital signal processors (abbreviated DSP) 702 are preferably provided within the signal processing module 648. A multi-channel transcoder rate adapter unit 308 is preferably implemented in a digital signal processor 702. That is, one or more digital signal processors 702 preferably incorporate functions associated with the transcoder rate adapter unit 308. Such digital signal processors 702 preferably include multiple input and output buffers for storing multiple channel audio data, and perform rate adaption through an interrupt-driven routine that places the appropriate channel data onto both the near-end and far-end transmission lines at the appropriate data rate. With the implementation of rate adaption, such digital signal processors 702 also has further processing power available to perform encoding and decoding of the incoming audio data. In addition to functions associated with the transcoder rate adapter 308, an echo-cancellation capability may be advantageously provided by the digital signal processors 702 by utilizing the already robust voice activity detection bits produced in transcoding a signal. An example of a single digital signal processor 702 that provides transcoding, rate adaption, and echo-cancellation functions, and using an improved decoding process, is disclosed in U.S. patent application No. 08/678,254, entitled "Multi-Channel Transcoder Rate Adapter Having Low Delay and Integral Echo Cancellation," naming James M. Davis and James D. Pruett as inventors, filed Jul. 11, 1996, and which is incorporated by reference herein for all purposes.

An E1 or T1 transmission line providing a 16,000 bits per second signal, which may carry four traffic channels, may be coupled to an interface module 650. That signal may, in turn, be connected to a digital signal processor 702 over a high speed bus 706. A digital signal processor 702 is further connected to a 64,000 bits per second transmission line also capable of carrying, for example, four traffic channels. The 64,000 bits per second transmission line can be, for example, a 64,000 bits per second PCM line. These lines are functionally bi-directional; each transmission line is connected to both an input and output of the digital signal processor 702. A digital signal processor 702 may be further connected via an address bus, a data bus, and a control bus to at least one random access memory and at least one read only memory device, in a conventional manner. A digital signal processor 702 used in this exemplary embodiment can be, for example, an Analog Devices 2106x digital signal processor chip.

A signal processing module 648 may be implemented in software, hardware or a suitable combination of software and hardware. In addition to one or more digital signal processors 702, a signal processing module 648 may include suitable data processing equipment, such as a processor, random access memory, four daughter board module ports, redundant High Level Data Link Controller bus interfaces, pulse code modulation matrix bus interfaces and other signal processing application hardware.

In operation, a subscriber unit 110 may attempt to place a call using the telecommunications system 400 by the following procedures. Signaling data and other call control data is received from a base transceiver station 440 in an E1 data format at an interface module 650. That data is then switched through a switching module 644 to a telephony support module 646, which performs call setup functions. A call processor assembly 450 receives the signaling data, and determines the call destination. Depending upon the call destination, the call processor assembly 450 sends signaling and call control data to the switched network 106, another telecommunications system, or a base transceiver station 440 serviced by the telecommunications system 400. If a telecommunications channel cannot be established, a busy signal, a no answer message, or another appropriate response is generated by the telephony support module 646, and the call attempt is terminated. If a telecommunications channel can be established, the call processor assembly 450 configures the switching module 644, telephony support module 646, interface modules 650, and signal processing module 648 to process the call data. A similar process is also used to handle incoming telecommunications channels from other telecommunications switches or the switched network 106, or to de-allocate elements of the telecommunications system 400 after the call is completed.

The present invention is well adapted to carry out the objects and attain the ends and advantages mentioned, as well as others inherent therein. While an exemplary embodiment of the invention have been given for the purposes of disclosure, alternative embodiments, changes and modifications in the details of construction, interconnection and arrangement of parts will readily suggest themselves to those skilled in the art after having the benefit of this disclosure. This invention is not necessarily limited to the specific embodiment and examples illustrated and described above. All embodiments, changes and modifications encompassed within the spirit of the invention are included, and the scope of the invention is defined by a proper construction of the following claims.

What is claimed is:

1. A software architecture for a wireless telecommunications system comprising:

a call processing software layer, which includes one or more software entities, encapsulating operations concerning the processing of calls directed to or from the telecommunications system; and a management software layer, which includes one or more software entities, encapsulating operations concerning operations, administration and maintenance related information.

2. The software architecture for a telecommunications system according to claim 1, wherein at least one of the software entities of the call processing software layer software layer may invoke one or more of the encapsulated operations of the management software layer.

3. The software architecture for a telecommunications system according to claim 1, wherein at least one of the software entities of the management software layer may invoke one or more of the encapsulated operations of the call processing software layer.

4. The software architecture for a telecommunications system according to claim 1, wherein the management software layer stores and accesses the operations, administration and maintenance related information on a data base.

5. The software architecture for a telecommunications system according to claim 1, further comprising a resource software layer, which includes one or more software entities, encapsulating operations that manage and provide access to telephony resources.

6. The software architecture for a telecommunications according to claim 5, wherein at least one of the software entities of the resource software layer may invoke one or more of the encapsulated operations of either the call processing software layer or the management software layer.

7. The software architecture for a telecommunications system according to claim 5, wherein the telephony resources include a switch.

8. A telecommunications system comprising:

a call processor assembly including one or more first processors and a call processing application executed by the first processor(s), the call processing application including one or more software entities that encapsulate operations concerning the processing of calls directed to or from the telecommunications system; and a network management system including a client portion and a server portion, the client portion including one or more second processors and a client application executed by the second processor(s), the client application including one or more software entities that encapsulate operations concerning the presentation of operations, administration and maintenance related information to a user for adaptation by the user, the server portion including one or more third processors and a server application executed by the third processor(s), the server application including one or more software entities that encapsulate operations concerning the storage of and access to the operations, administration and maintenance related information.

9. The telecommunications system according to claim 8, wherein at least one of the software entities of the call processing application may invoke one or more of the encapsulated operations of the server application.

10. The telecommunications system according to claim 8, wherein at least one of the software entities of the server application may invoke one or more of the encapsulated operations of the call processing application.

11. The telecommunications system according to claim 8, wherein at least one of the software entities of the server application may invoke one or more of the encapsulated operations of the client application.

12. The telecommunications system according to claim 8, wherein at least one of the software entities of the client application may invoke one or more of the encapsulated operations of the server application.

13. The telecommunications system according to claim 8, wherein the call processor assembly further includes a resource application executed by the first processor(s), the resource application including one or more software entities that encapsulate operations concerning the management and provision of telephony resources.

14. The telecommunications system according to claim 13, wherein at least one of the software entities of the resource application may invoke one or more operations of either the call processing application or the server application.

15. The telecommunications system according to claim 13, wherein an object request broker is associated with the call processing application and the resource application to provide information concerning the encapsulated operations of the call processing application and the resource application so as to enable at least one software entity of the server application to invoke one or more of the encapsulated operations of either the call processing application or the resource application.

16. The telecommunications system according to claim 13, wherein a proxy is associated with at least one software entity of the call processing application or the resource application to provide information concerning the encapsulated operations associated with that software entity so as to enable at least one software entity of the server application to invoke the encapsulated operations associated with that software entity.

17. The telecommunications system according to claim 8, wherein an object request broker is associated with the call processing application to provide information concerning the encapsulated operations of the call processing application so as to enable at least one software entity of the server application to invoke one or more of the encapsulated operations of the call processing application.

18. The telecommunications system according to claim 8, wherein a proxy is associated with at least one software entity of the call processing application to provide information concerning the encapsulated operations associated with that software entity so as to enable at least one software entity of the server application to invoke the encapsulated operations associated with that software entity.

19. The telecommunications system according to claim 8, wherein an object request broker is associated with the server application to provide information concerning the encapsulated operations of the server application so as to enable at least one software entity of either the client application or the call processing application to invoke one or more of the encapsulated operations of the client application.

20. The telecommunications system according to claim 8, wherein an object request broker is associated with at least one software entity of the server application to provide information concerning the encapsulated operations associated with that software entity so as to enable at least one software entity of either the client application or the call processing application to invoke the encapsulated operations associated with that software entity.

21. The telecommunications system according to claim 8, wherein an object request broker is associated with the client application to provide information concerning the encapsulated operations of the client application so as to enable at least one software entity of the server application to invoke one or more of the encapsulated operations of the server application.

22. The telecommunications system according to claim 8, wherein an object request broker is associated with at least one software entity of the client application to provide information concerning the encapsulated operations associated with that software entity so as to enable at least one software entity of the server application to invoke one or more of the encapsulated operations associated with that software entity.

23. The telecommunications system according to claim 8, wherein the server application provides data to the client application from which the client application causes the generation of a graphical user interface.

24. A software architecture for a telecommunications system comprising:

a call processing software layer, which includes one or more software entities to provide call processing operations, and which further includes a first object request broker that maintains information by which at least one other software layer may invoke certain of those operations;

a resource software layer, which includes one or more software entities configured to manage and provide access to telephony resources, and which further includes a second object request broker that maintains information by which at least one other software layer may invoke certain of those operations;

a management software layer, which includes one or more software entities to provide operations, administration and maintenance related operations, and which further includes a second object request broker that maintains information by which at least one other software layer may invoke certain of those operations.

25. The software architecture for a telecommunications system according to claim 24, wherein the first object request broker is configured to facilitate the invocation of an operation of a particular software entity of the call processing software layer by a given software entity of either the resource software layer or the management software layer.

26. The software architecture for a telecommunications system according to claim 25, wherein a proxy is associated with the given software entity, the proxy being configured to receive a response to the operation invoked by the particular software entity.

27. The software architecture for a telecommunications system according to claim 24, wherein the second object request broker is configured to facilitate the invocation of a particular software entity of the resource software layer by a given software entity of either the call processing software layer or the management software layer.

28. The software architecture for a telecommunications system according to claim 27, wherein a proxy is associated with the given software entity, the proxy being configured to receive a response to the operation invoked by the particular software entity.

29. The software architecture for a telecommunications system according to claim 24, wherein the third object request broker is configured to facilitate the invocation of a particular software entity of the management software layer by a given software entity of either the resource software layer or the call processing software layer.

30. The software architecture for a telecommunications system according to claim 29, wherein a proxy is associated with the given software entity, the proxy being configured to receive a response to the operation invoked by the particular software entity.

31. A method for communicating between applications associated with a telecommunications system comprising:

providing a first software layer having one or more software entities and a second software layer also having one or more software entities;

receiving a request issued from a given software entity of the first software layer to access a particular operation of a particular software entity of the second software layer;

determining an appropriate messaging format to invoke the particular operation;

composing a message based on the appropriate messaging format; and directing the composed message to the given software entity.

32. The method according to claim 31, wherein determining an appropriate messaging scheme to invoke the particular operation comprises:

defining an interface for the particular operation;

retrieving the defined interface; and composing a message in accordance with the defined interface that can be directed to the identified software entity.

33. The method according to 31, wherein the interface for the particular operation is predetermined.

34. The method according to 31, wherein the interface for the identified second software entity is dynamically defined upon receiving the request.

35. The method according to claim 31, wherein either the first software layer or the second software layer is configured to provide call processing functions.

36. The method according to claim 31, wherein the one or more software entities of either the first software layer or the second software layer are configured to manage and provide access to telephony resources.

37. The method according to claim 31, wherein the one or more software entities of either the first software layer or the second software layer are configured to provide operations, administration and maintenance related functions.

* * * * *